Figure 1:
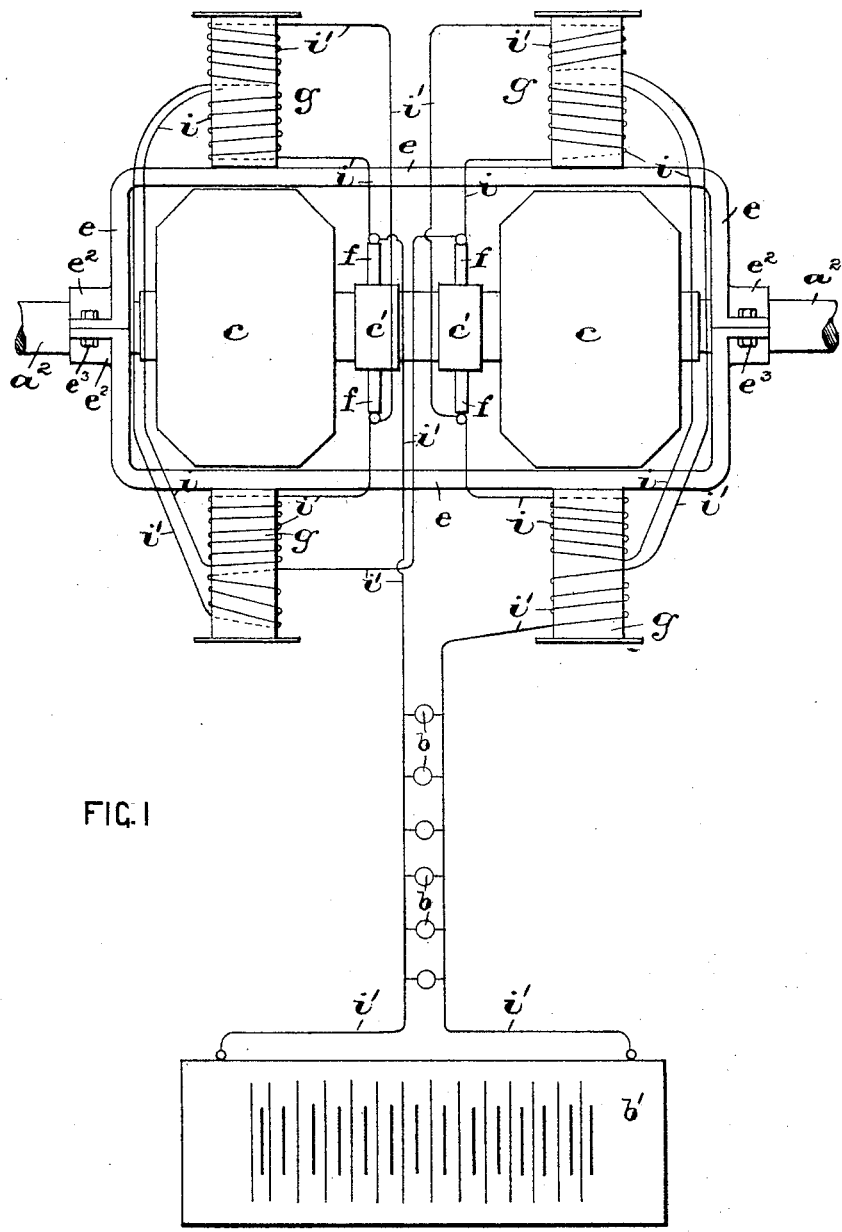

(No Model.) 2 Sheets—Sheet 1.

M. MOSKOWITZ.
ELECTRIC LIGHTING SYSTEM FOR RAILWAY CARS.

No. 531,421. Patented Dec. 25, 1894.

WITNESSES: INVENTOR:
B. Mortimer Trusdell. MORRIS MOSKOWITZ.
Fred Schlueter. BY Fred C. Fraentzel, ATT'Y.

(No Model.) 2 Sheets—Sheet 2.

M. MOSKOWITZ.
ELECTRIC LIGHTING SYSTEM FOR RAILWAY CARS.

No. 531,421. Patented Dec. 25, 1894.

WITNESSES:
B. Mortimer Trusdell.
Fred Schluter

INVENTOR:
MORRIS MOSKOWITZ.
BY Fred C. Fraentzel, ATT'Y.

UNITED STATES PATENT OFFICE.

MORRIS MOSKOWITZ, OF NEWARK, NEW JERSEY, ASSIGNOR TO HIMSELF AND LEON D. ADLER, OF SAME PLACE, AND A. S. ADLER, OF PHILADELPHIA, PENNSYLVANIA.

ELECTRIC-LIGHTING SYSTEM FOR RAILWAY-CARS.

SPECIFICATION forming part of Letters Patent No. 531,421, dated December 25, 1894.

Application filed August 10, 1894. Serial No. 519,958. (No model.)

*To all whom it may concern:*

Be it known that I, MORRIS MOSKOWITZ, a citizen of the United States, residing at Newark, in the county of Essex and State of New Jersey, have invented certain new and useful Improvements in Means for Generating Electricity from a Car-Axle; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has reference to improvements in that class of electrical apparatus, for generating electricity by means of a dynamo-electric apparatus mounted on a car wheel axle, and the invention is designed especially for use with a dynamo placed and secured on the car-wheel axle in the manner to be hereinafter more fully set forth.

The invention has for its object to provide a dynamo for this class of work, having two or more armatures arranged on the car wheel axle and connected in series, to produce great tension or pressure from a comparatively slowly rotating car wheel axle.

It is a well known fact, that with the variations of speed of a car wheel axle, often running at a very low speed, as, for instance, in nearing railway stations, in order to produce sufficient tension, a dynamo of large proportion of parts and hence great weight is necessary. This renders the use of an ordinary dynamo on the car-wheel axle for electric lighting purposes impracticable, on account of the small space available upon the truck underneath the car. To overcome this difficulty, I have arranged comparatively small armatures, connected in series, on a tubing, preferably of brass, which can be readily slipped on the car-wheel axle and secured thereon.

A further object of my invention is to provide a dynamo having its armature wires loosely arranged in rubber or other like insulating material, which forms a cushion support for each wire, and thoroughly insulates and protects the wires from rubbing against one another, as is ordinarily the case in the common wire coverings now used. This prevents the short circuiting of the armature wires and hence does not render the dynamo useless.

The invention is therefore designed to furnish a simple and effective apparatus, and consists in the details of construction and combinations of parts to be hereinafter particularly specified and finally embodied in the clauses of the claim.

The invention is illustrated in the accompanying sheets of drawings, in which—

Figure 2:
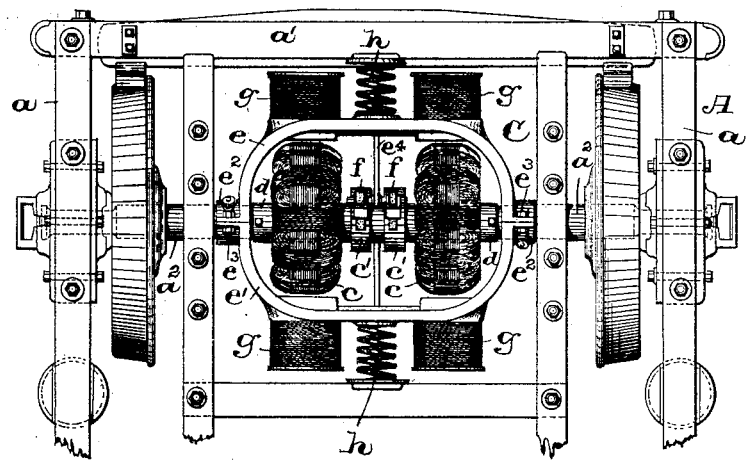
Figure 3:
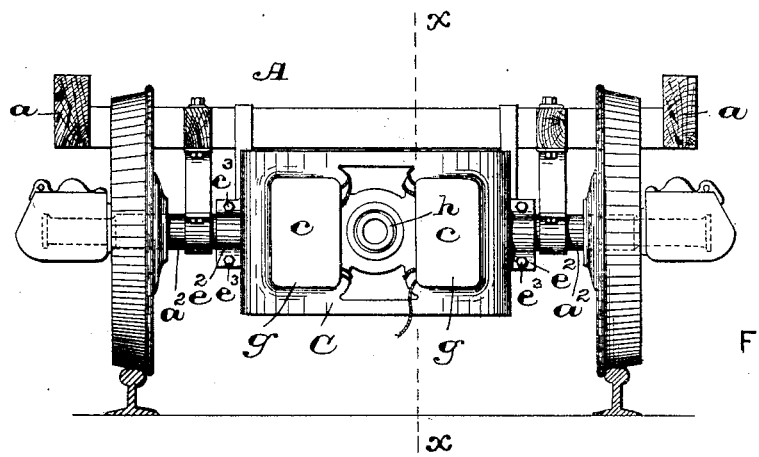
Figures 4, 5, 6:
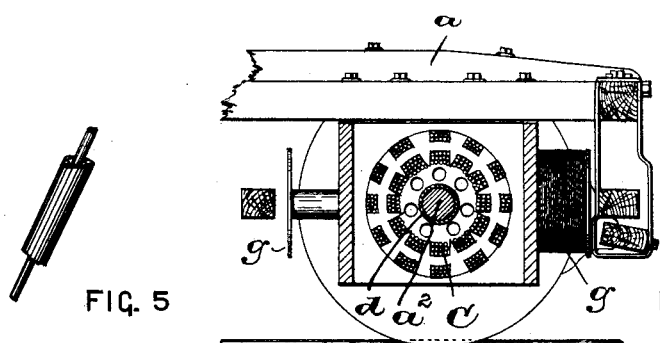

Figure 1 is a diagrammatic view of the dynamo, embodying the principles of my invention, clearly illustrating the manner of connecting the armatures in series and showing in connection therewith, in the main circuit operating lamps and a storage battery. Fig. 2 is a general plan of the truck in part and the dynamo mounted on the car wheel axle. Fig. 3 is an end elevation of the truck and dynamo, and Fig. 4 is a vertical section on line $x$ in said Fig. 2. Fig. 5 is a perspective view, and Fig. 6 a cross section of one of the cushion-supported armature wires.

In said drawings, A is the car wheel truck, $a, a$, the equalizing bars, and $a'$ the cross beam at the end of the truck, connecting the bars $a, a$.

C is the dynamo which supplies the electrical energy for operating the lamps $b$ or other devices on the car and also for charging the battery $b'$. The dynamo, which is mounted on the car wheel axle $a^2$, comprises therein two or more armature coils $c, c$, which are preferably arranged on a tube $d$, slipped over the axle $a^2$, as shown, and provided with suitable commutators $c', c'$. Suitable frame-sections $e$ and $e'$ provided with portions $e^2$ and bolts $e^3$ for loosely bolting said sections on the car-wheel axle, form the fields for any number of armature coils $c, c$. The brushes $f, f$, are suitably secured to said frame-sections $e$ and $e'$, either on the part $e^4$, or in any other well known manner, and are in operative contact with the commutators, as will be understood from an inspection of the drawings.

The field magnets $g, g$ are on the outside of the frame-sections $e$ and $e'$, and said sections are supported by means of powerful springs $h$ connected with the timbers of the truck, substantially as illustrated in Fig. 2. This permits a swinging motion of the frame work of the dynamo, but still prevents the turning of the dynamo on the axle and hence retains the dynamo at all times in its operative working position.

The wiring of the armatures and the field magnets, will be clearly seen from Fig. 1, the circuit wires $i, i$, connecting each brush in each armature in shunt circuit, while the wires $i', i'$ connect the several armatures on the car wheel axle in series, as clearly indicated in said Fig. 1. Furthermore, each field magnet has a differential or compound winding, whereby the counter winding will counteract the excess of energy due to the increase of armature speed, when the train is moving rapidly, as will be understood.

As has been previously stated, the armature wires are arranged in a cushion of insulating material, such as rubber tubing or the like, so that when wound, each wire will be cushioned against its neighbor and no amount of friction caused by the oscillation of the dynamo on the truck frame, will wear off the insulation to cause short-circuiting, as is invariably the case with the ordinary insulation, when the dynamos are used in connection with the car wheel axle for lighting railway trains.

Of course it will be evident, that I may use any number of armatures connected in series, in connection with one field frame, the field magnets of which are arranged, substantially as illustrated and described. Of course it will also be understood, that I may use in connection with the dynamo herein shown and described, any of the well known forms of pole changers, acting automatically or otherwise, whereby the current can be made to travel in either direction, according in which direction the railway car is being propelled.

Having thus described my invention, what I claim is—

1. In a system for electrically lighting railway cars, in combination, with the car-axle, frame-sections $e$ and $e'$ having bearing portions $e^2$ and bolts $e^3$ for securing said sections to the car wheel axle, field magnets $g, g$, on the outside of said frame-sections, and two or more armatures arranged and wound on said axle and connected in series or tension, substantially as and for the purposes set forth.

2. In a system for electrically lighting railway cars, in combination, with the car axle, frame-sections $e$ and $e'$ having bearing portions $e^2$ and bolts $e^3$ for securing said sections to the car-wheel axle, field-magnets, $g, g$, on the outside of said frame-sections, springs, as $h$, connecting said frame-sections with the truck frame, and two or more armatures arranged and wound on said axle and connected in series or tension, substantially as and for the purposes set forth.

3. In a system for electrically lighting railway cars, in combination, with the car axle, frame-sections $e$ and $e'$ having bearing portions $e^2$ and bolts $e^3$ for securing said sections to the car-wheel axle, a tube $d$ on the car-wheel axle between the bearing-portions of said frame-sections, field magnets $g, g$ on the outside of said frame-sections, and two or more armatures arranged and wound on said tube $d$ and connected in series or tension, substantially as and for the purposes set forth.

4. In a system for electrically lighting railway cars, in combination with the car-wheel axle, frame-sections $e$ and $e'$ having bearing portions $e^2$ and bolts $e^3$ for securing said sections to the car-wheel axle, a tube $d$ on the car-wheel axle between the bearing portions of said frame-sections, field magnets $g, g$ on the outside of said frame-sections, springs, as $h$, connecting said frame-sections with the truck frame, and two or more armatures arranged and wound on said tube $d$ and connected in series or tension, substantially as and for the purposes set forth.

5. In the herein described dynamo adapted to be mounted on a car-wheel axle, an armature winding, having the wires thereof cushion supported and insulated, in the manner, substantially as and for the purposes set forth.

In testimony that I claim the invention set forth above I have hereunto set my hand this 11th day of July, 1894.

MORRIS MOSKOWITZ.

Witnesses:
FREDK. C. FRAENTZEL,
LEON D. ADLER.